United States Patent
Mayer

[15] 3,704,035
[45] Nov. 28, 1972

[54] COUPLING ASSEMBLY FOR REPLACEMENT OF RETURN BEND

[72] Inventor: Robert H. Mayer, Bridgeport, N.Y.

[73] Assignee: Carrier Corporation, Syracuse, N.Y.

[22] Filed: Oct. 19, 1970

[21] Appl. No.: 81,972

[52] U.S. Cl. ............... 285/157, 285/158, 285/334.5, 285/387
[51] Int. Cl. ............................................. F16l 41/00
[58] Field of Search...285/157, 334.5, 388, 387, 415, 285/382.7, 15, 158

[56] References Cited

UNITED STATES PATENTS

| | | |
|---|---|---|
| 2,026,674 | 1/1936 | Edwards ................ 285/415 X |
| 3,088,755 | 5/1963 | Klamm ............... 285/334.5 X |
| 2,687,229 | 8/1954 | Laurent ................. 285/157 X |
| 406,060 | 7/1889 | Potts .................... 285/334.5 X |
| 3,113,792 | 12/1963 | Brown .................... 285/415 X |
| 1,865,016 | 6/1932 | Kirkpatrick ......... 285/334.5 X |
| 3,103,373 | 9/1963 | Lennon et al. ....... 285/382.7 X |

Primary Examiner—Thomas F. Callaghan
Attorney—Harry G. Martin, Jr. and J. Raymond Curtin

[57] ABSTRACT

The coupling assembly is employed for attaching a return bend to a heat exchanger tube. The tube is formed with an enlarged or expanded end portion spaced close to the tube sheet and terminating in an outwardly flaring bell. A coupling nut is formed with a shouldered bore having a diameter sufficient to permit the nut to be passed over the flaring bell end of the tube and positioned on the tube sheet. The segments of a two-part split sleeve are formed at one end to provide a conical surface comparable to the flaring bell end of the tube. The conical surface is spaced from opposite ends of the sleeve a distance not greater than the spacing between the tube sheet and the expanded end portion of the tube. The sleeve segments are insertable between the tube and the nut when the same is positioned on the tube sheet. The sleeve segments are formed to provide a shoulder engageable by the shoulder in the nut. The nut is threaded on a coupling member fixed on a return bend and surface in conjunction with the split sleeve to draw the coupling member against the flared bell end of the tube.

2 Claims, 6 Drawing Figures

PATENTED NOV 28 1972 3,704,035

INVENTOR.
ROBERT H. MAYER
BY P. Emmett Thompson
ATTORNEY

COUPLING ASSEMBLY FOR REPLACEMENT OF RETURN BEND

BACKGROUND OF THE INVENTION

To the end of economy many heat exchangers, as for example condensers employed in refrigeration systems, are now fabricated with aluminum tubing. Conventionally, the heat exchanger tubes are connected at their ends with aluminum return bends. These return bends are attached to the ends of the tubes by soldering.

In some heat exchangers now in use, the ends of the heat exchanger tubes extend only a short distance beyond the supporting tube sheet. The extending tube ends are expanded to receive the ends of the return bends and the expanded portions terminated in outwardly flared bells to provide an annular recess for the placement of the solder preform. Generally, a zinc base solder is used which in the soldering process forms an alloy with the aluminum tubing. Due to the oxides subsequently formed, a second zinc base solder application, as a repair or resoldering of the joint, is extremely difficult and very impractical, if at all possible.

With this construction a defective return bend can be removed by melting the solder. However, as stated above, a new or replacement return bend cannot, with any degree of confidence, be soldered to the heat exchanger tubes from which the defective return bend has been removed by field service personnel. Due to the fact that the heat exchanger tubes extend only a short distance from the tube supporting sheet there is insufficient tube length remaining which can be severed to provide a fresh tube end to which the replacement return bend could be soldered.

This invention has as an objective a coupling assembly which serves to conventionally attach a replacement return bend to aluminum heat exchanger tubes from which a defective return bend has been removed.

BRIEF SUMMARY OF THE INVENTION

Coupling nuts are formed with a bore with sufficient dimension so that the nuts can be passed over the flaring ends of the tubes and positioned on the tube sheets. Segments of a two-part split sleeve are insertable between the nut and the tube. These segments are formed at their outer ends to provide a conical surface comparable to the flaring bell ends of the tube. This conical surface is spaced from the opposite or bottom end of the sleeve, a distance not greater than the space between the tube sheet and the tube enlargement. This permits the nut with an inserted segment to be moved sufficiently eccentric to the tube for the insertion of the other sleeve segment. The nut and the sleeve segments have inner engaging shoulders whereby when the nut is threaded on a coupling member a member is drawn tight against the flared end of the tube.

DESCRIPTION OF THE PREFERRED EMBODIMENT

Figure 1:
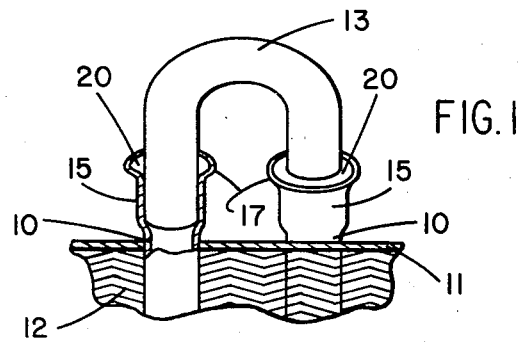
FIG. 1 is a side elevational view with parts in section illustrating a conventional return bend soldered to a pair of heat exchanger tubes.

Referring to FIG. 1, the heat exchanger tubes 10 are mounted in a tube sheet 11. The tubes are provided with conventional heat transfer fins 12 and the ends of the tubes extend a short distance beyond the sheet 11. The extending ends of the tubes are enlarged as by being expanded. The ends of the return bend 13 are inserted in the expanded end portions 15 of the heat exchanger tubes. The outer ends of the expanded end portions 15 are flared outwardly to form bells 17 which serve as annular recesses for the reception of molten solder indicated at 20. This construction is used universally for the attachment of the aluminum return bends to the aluminum heat exchanger tubes.

The solder employed is in the form of a zinc based alloy, which when applied to the joint forms an alloy with the aluminum tubes. If an attempt is made to solder a replacement return bend to the tubes, the oxides formed upon the soldering and removal of the initial return bend usually prevents the formation of a fusion bond between the replacement return bend and the heat exchanger tubes.

Figure 5:
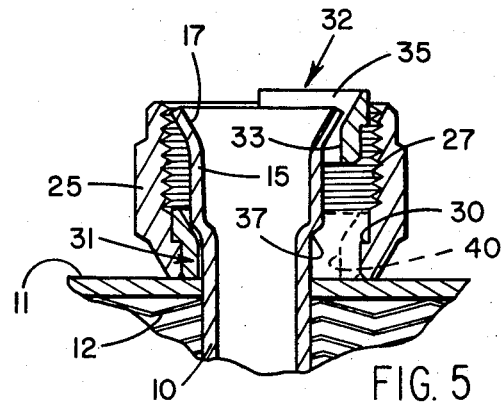
FIG. 5 is a sectional view of tube end and nut positioned on the tube sheet with one part of the split sleeve member inserted in the nut and the other part of the sleeve partially inserted in the nut.
Figure 4:
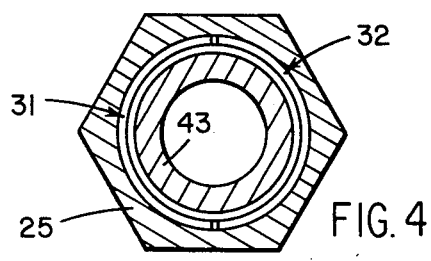
FIG. 4 is a sectional view taken on a line corresponding to line 4—4 FIG. 3.

The coupling of my invention includes a coupling nut 25. A substantial portion of the nut body is formed with internal threads 27 and with an annular shoulder 30 spaced inwardly from the opposite end of the nut. The internal diameter of the shouldered end of the nut is slightly greater than the diameter of the flared bell 17 of the heat exchanger tube 10. Accordingly, the nut 25 may be sleeved or passed over the flaring end of the tube and positioned on the tube sheet 11, as shown in FIG. 5.

Figure 6:
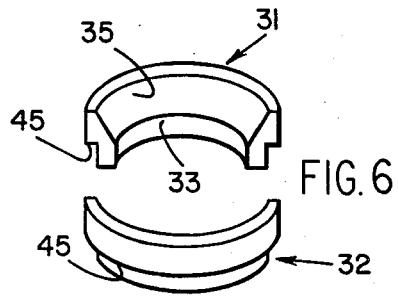
FIG. 6 is an isometric view of the two-part split sleeve.
Figure 2:
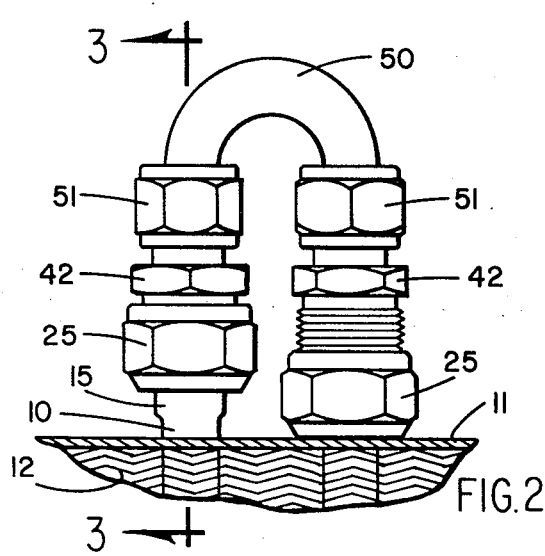
FIG. 2 is a view similar to FIG. 1 illustrating the replacement return bend assembly embodying my invention with one of the coupling nuts disconnected from the coupling member.

The coupling assembly also includes a two-part split sleeve. The sleeve segments are shown at 31,32 FIG. 6. The segments 31,32 are formed to provide a cylindrical bore 33 at one end of the sleeve, the bore 33 merging with an outwardly extending conical surface 35 formed and dimensioned comparable to the flaring bell 17 at the end of the heat exchanger tube 10. The axial length 31,32 cylindrical bore 33 is not greater than the spacing between the tube sheet 11 and the lower end of the tube enlargement 15 indicated at 37.

With the nut 25 sleeved over the end of the heat exchanger tube and positioned on the tube sheet 11, a sleeve segment as 31 can be inserted between the nut and the heat exchanger tube. The nut can then be shifted radially to a position eccentric with the tube. As illustrated in FIG. 5, the nut has been so shifted, moving the inserted sleeve segment against the heat exchanger tube. This positions the opposite side of the nut in spaced relation to the tube whereby the mating segment 32 can be inserted between the nut and the tube. In FIG. 5, the segment 32, is illustrated, as partially inserted between the nut and the tube. The completely inserted segment being indicated in dotted outline at 40, FIG. 5. Inasmuch as the bore 33 of the sleeve segments does not extend axially, a greater distance than the spacing between the sheet 11 and the bottom 37 of the tube enlargement, the initially inserted sleeve segment 31 can be moved against the tube as illustrated in FIG. 5, providing sufficient space for the insertion of the mating sleeve segment.

The assembly includes a coupling member 42 having an externally threaded end portion for threaded engagement by the nut 25. The end 43 of the coupling member 42 is formed with a conical surface 44 comparable to the flaring bell 17 of the heat exchanger tube. The nut 25, with the sleeve segments inserted therein, is moved outwardly and threaded onto the coupling member 42. The sleeve segments 31, 32 are formed with external shoulders 45 which are engaged by the shoulder 30 formed in nut 25. It will be apparent referring to the FIG. 3, as the nut 25 is tightened the flaring bell end of the heat exchanger tube is drawn into tight engagement with the conical end surface 44 of the coupling member 42. If desired, a sealing composition may be applied to the flaring bell end of the heat exchanger tube 10, or to the end 43 of the coupling member 42.

Figure 3:
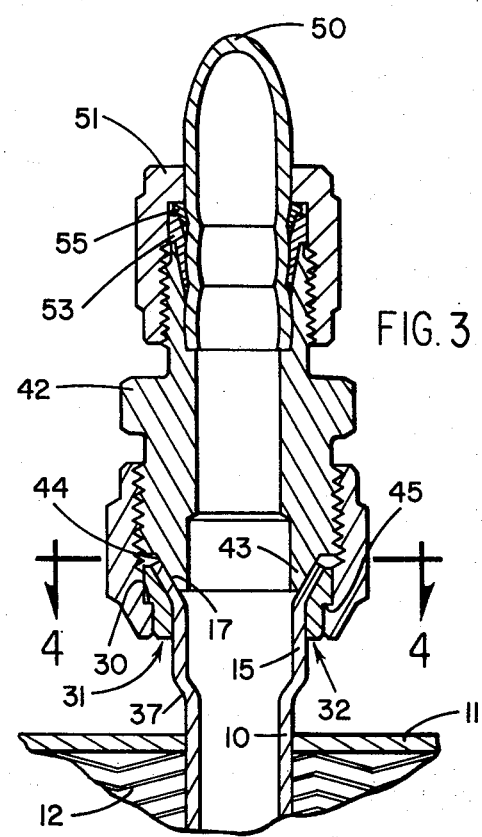
FIG. 3 is an enlarged view taken on line 3—3 FIG. 2.

Nuts 25 are positioned over a pair of heat exchanger tubes 10, from which the original return bend 13 has been removed. Coupling members 42 are attached to the ends of a replacement return bend 50. The coupling members 42 can be fixed to the ends of the return bend 50 by any suitable arrangement. As shown in FIG. 3, the coupling members are formed at their opposite ends with an external threaded surface for the reception of a compression nut 51. Contractile sleeves 53, 55 are used in conjunction with nut 51 to provide a liquid type connection between the coupling member 42 and the replacement bend 50. With the coupling assembly of my invention, a defective return bend can be quickly and conveniently replaced in the field with only the use of common hand tools.

I claim:

1. A coupling assembly for attaching a return bend to a heat exchanger tube, said tube being formed with an expanded cylindrical end portion spaced outwardly from a tube support sheet, said expanded end portion terminating in an outwardly flaring bell which extends a relatively short distance from the tube sheet, said tube having a substantially constant wall thickness; said assembly including a coupling nut formed at the inner end thereof with a cylindrical bore terminating at an annular shoulder surface extending radially outward from said cylindrical bore, and merging with an enlarged bore extending to the outer end of said nut, said cylindrical bore being dimensioned to permit said nut to be passed over said flaring bell end of said tube, a two-part split sleeve formed at the inner end portion thereof with a cylindrical bore merging with an outwardly extending conical surface formed comparable to said flaring bell end of said tube, said conical surface being spaced from said inner end of said sleeve a distance not greater than the spacing of said expanded portion of said tube from said tube sheet; said sleeve being formed intermediate its ends with an external shoulder spaced axially for engagement by said shoulder in said nut, when said nut and sleeve are positioned on said tube sheet, said enlarged bore in said nut being dimensioned to permit the segments of said sleeve to be inserted successively between said tube and said nut when said nut is positioned on said tube sheet, said assembly further including a coupling member fixed to a return bend and being formed for threaded engagement by said nut, said nut being cooperable upon being threaded to said coupling member to draw said split sleeve against said flaring bell end of said tube and the latter in leak-tight engagement with said coupling member.

2. A coupling assembly as defined in claim 1 wherein said enlarged bore in said nut is formed with internal threads.

* * * * *